(12) United States Patent
Neuman

(10) Patent No.: US 9,560,366 B2
(45) Date of Patent: Jan. 31, 2017

(54) VIDEO ENCODING FOR SOCIAL MEDIA

(71) Applicant: Broadcom Corporation, Irvine, CA (US)

(72) Inventor: Darren Neuman, Palo Alto, CA (US)

(73) Assignee: BROADCOM CORPORATION, Irvine, CA (US)

( * ) Notice: Subject to any disclaimer, the term of this patent is extended or adjusted under 35 U.S.C. 154(b) by 171 days.

(21) Appl. No.: 14/561,814

(22) Filed: Dec. 5, 2014

(65) Prior Publication Data

US 2016/0119633 A1    Apr. 28, 2016

Related U.S. Application Data

(60) Provisional application No. 62/067,324, filed on Oct. 22, 2014.

(51) Int. Cl.
| | |
|---|---|
| *H04N 7/16* | (2011.01) |
| *H04N 7/173* | (2011.01) |
| *H04N 19/40* | (2014.01) |
| *H04L 29/06* | (2006.01) |
| *H04N 19/172* | (2014.01) |
| *H04N 19/107* | (2014.01) |
| *H04N 19/132* | (2014.01) |
| *H04N 19/162* | (2014.01) |

(52) U.S. Cl.
CPC .............. *H04N 19/40* (2014.11); *H04L 67/40* (2013.01); *H04N 19/107* (2014.11); *H04N 19/132* (2014.11); *H04N 19/162* (2014.11); *H04N 19/172* (2014.11)

(58) Field of Classification Search
CPC .............. H04N 21/433; H04N 21/4331; H04N 21/4334; H04N 21/437
USPC .......................... 725/109, 110, 131-134, 151
See application file for complete search history.

(56) References Cited

U.S. PATENT DOCUMENTS

| | | | |
|---|---|---|---|
| 2003/0046704 A1* | 3/2003 | Laksono | ............ H04N 7/17336 725/96 |
| 2010/0169942 A1* | 7/2010 | Dasher | .............. G06F 17/30817 725/100 |
| 2010/0242074 A1* | 9/2010 | Rouse | ................... H04L 12/588 725/100 |

* cited by examiner

*Primary Examiner* — Dominic D Saltarelli
(74) *Attorney, Agent, or Firm* — Foley & Lardner LLP

(57) ABSTRACT

In some aspects, the disclosure is directed to methods and systems for encoding and sharing media clips via a social networking provider responsive to a user interaction via a single "like" or "share" button. Media may be constantly buffered as the user watches the program, such that the user need not initiate recording, enabling the user to quickly share amusing or media clips as they happen live. The device may decode, scale or subsample, and compress or re-encode the media to take up less space in a buffer of the device and/or to comply with copyright fair use requirements. Responsive to the user interaction or "share" command, the device may transfer the contents of the buffer to a social media service along with instructions to generate a post to the social network identifying the user, media, and/or buffer contents.

20 Claims, 6 Drawing Sheets

VIDEO ENCODING FOR SOCIAL MEDIA

RELATED APPLICATIONS

This applications claims priority to and the benefit of U.S. Provisional Patent Application No. 62/067,324, entitled "Video Encoding for Social Media," filed Oct. 22, 2014, the entirety of which is hereby incorporated by reference for all purposes.

FIELD OF THE DISCLOSURE

This disclosure generally relates to systems and methods for video sharing. In particular, this disclosure relates to systems and methods for sharing received video via social networking platforms.

BACKGROUND OF THE DISCLOSURE

Social networks provide systems for users to share and discuss content, including media, such as short videos, movies, television programs, advertisements, music, and other such items. Users may post links to content on a user-specific webpage or timeline provided by the social network provider, and may view and comment on linked items on other users' webpages or timelines.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
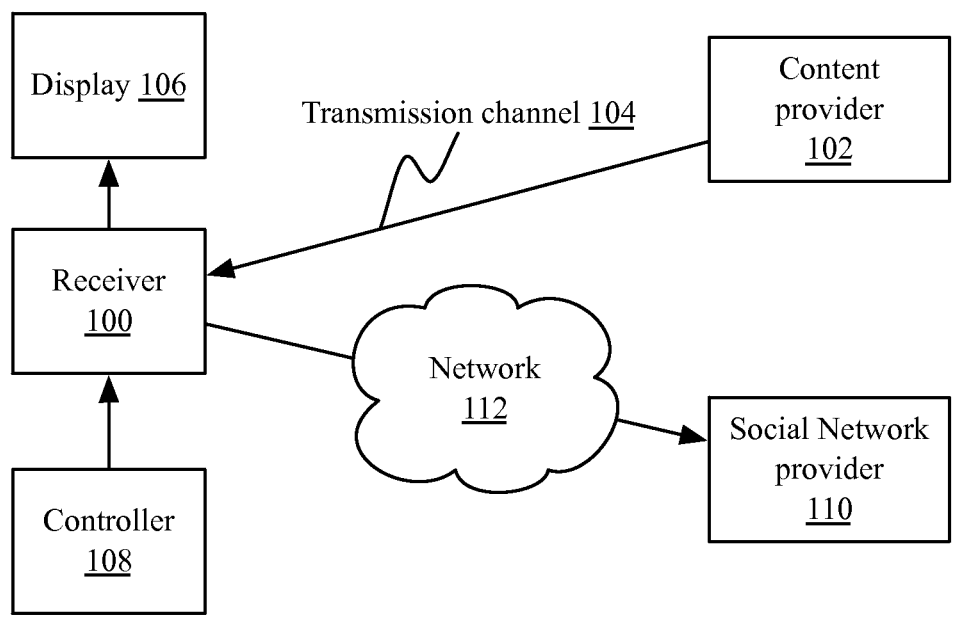
FIG. 1A is a block diagram depicting an embodiment of a system for encoding and sharing content via a social network.

The details of various embodiments of the methods and systems are set forth in the accompanying drawings and the description below.

DETAILED DESCRIPTION

A device receiving a video signal, such as a set-top box, smart television, cable or satellite receiver, or similar device, may be configured to encode and share media clips via a social networking provider or social media service responsive to a user interaction via, a single "like" or "share" button. Media may be constantly buffered as the user watches the video program, such that the user need not initiate recording. This may enable the user to quickly share amusing or interesting media clips, even as they happen live. The device may decode, scale or subsample, and compress or re-encode the media to take up less space in a buffer of the device and/or to comply with copyright fair use requirements. Responsive to the user interaction or "share" command, the device may transfer the contents of the buffer to a social media service along with instructions to generate a post to the social network identifying the user, media, and/or buffer contents. In some implementations, prior to transfer, the start and end points of the buffer may be shifted to the nearest intra-frames (frames that can be decoded independently) to provide a clean start and finish for the media clip.

In one aspect, the present disclosure is directed to a device for encoding and sharing media for social networks. The device includes a video decoder, a sharing engine including a buffer, and a network interface. The video decoder is configured to receive an encoded media stream at a first resolution; decode the encoded media stream; and provide the decoded media stream to a display output and the sharing engine. The sharing engine is configured to write predetermined duration of the decoded media stream to the buffer. The network interface is configured to, responsive to receipt of a capture command, retrieve the predetermined duration of the media stream from the buffer of the sharing engine, and transmit the retrieved predetermined duration of the media stream via a network to a second device.

In some implementations, the sharing engine further comprises a video encoder configured to encode the decoded media stream. In a further implementation, the sharing engine further comprises a subsampler configured to scale the decoded media stream to a second, lower resolution prior to encoding. In another further implementation, the network interface is further configured to trim the beginning and end of the retrieved duration of the decoded media stream to independently decodable frames prior to transmission of the media stream via the network to the second device. In some implementations, the buffer comprises a ring buffer, and the sharing engine is further configured to overwrite a portion of the buffered media stream. In another implementation, the device includes a receiver configured to receive the capture command from a third device. In still another implementation, the network interface is further configured to transmit an identification of the media stream to the second device for association with the trimmed duration of the decoded media stream. In yet still another implementation, the network interface is further configured to transmit a user credential to the second device.

In another aspect, the present disclosure is directed to a method for encoding and sharing media for social networks. The method includes receiving, by a video decoder of a device, a media stream. The method also includes writing, by a sharing engine of the device, the media stream to a buffer. The method further includes receiving, by the device, a capture command. The method also includes retrieving, by the device, the buffered media stream, responsive to receiving the capture command. The method also includes transmitting the buffered media stream to a second device, by a network interface of the device, responsive to receiving the capture command.

In some implementations, the method includes decoding, by the video decoder, the media stream; providing, by the video decoder, the decoded media stream to a display output and the sharing engine; and encoding, by the sharing engine, the decoded media stream. In a further implementation, the media stream is received by the video decoder and decoded at a s resolution; and the method includes scaling the media stream, by a subsampler of the sharing engine, to a second, lower resolution. In another further implementation, the method includes writing the encoded media stream at the second, lower resolution to the buffer.

In some implementations, the media stream is received by the video decoder and decoded at a first frame rate; and the method includes subsampling the media stream, by a subsampler of the sharing engine, to a second, lower frame rate. In other implementations, the method includes trimming the beginning and end of the buffered media stream to independently decodable frames, by the device, prior to transmission of the buffered media stream to the second device. In still other implementations, the method includes receiving, by the device, the capture command from a third device. In yet other implementations, the method includes transmitting an identification of the media stream to the second device for association with the media stream. In yet still other implementations, the method includes transmitting a user credential to the second device. In a further implementation, the second device provides the buffered media stream to one or more client devices as part of a social networking profile associated with the user credential.

In still another aspect, the present application is directed to a device for encoding and sharing media for social networks. The device includes an input device; and a transmitter configured to transmit a capture command to a second device, responsive to receiving a user interaction via the input device. The capture command causes the second device to retrieve a media stream from a buffer of the second device and transmit the buffered media stream via a network to a third device, the media stream received by the second device encoded at a first resolution, decoded, sealed to a second, lower resolution, encoded, and written to the buffer. In a further implementation, the input device comprises a button, and the transmitter comprises an infrared transmitter.

Referring first to FIG. 1A, illustrated is a block diagram depicting an embodiment of a system for encoding and sharing content via a social network. In brief overview, a receiver 100 may receive media, such as broadcast video programming, via a transmission channel 104 from a content provider 102. The receiver 100 may provide the media to a display 106. Responsive to a command from a controller 108, the receiver may provide a buffered portion of the received media to a social network provider 110 via a network 112 for sharing to one or more other users or clients.

Still referring to FIG. 1A and in more detail, a receiver 100 may include any type and form of device for receiving a media stream, such as a set-top box, a smart television, a cable receiver or cable box, a satellite receiver or demodulator, or other device, and may be generally referred to as a receiver 100, device 100, client 100, capture device 100, or by other such terms. In some implementations, a receiver 100 may be integrated with a display 106, such as in a smart television, while in other implementations, a receiver 100 may connect to a separate display 106 directly or via one or more other devices (e.g. multimedia switchers, video processors, A/V receivers, etc.).

Receiver 100 may receive media from a content provider 102 via a transmission channel 104. A content provider 102 may be any source of content including unicast, multicast, or broadcast content, such as a network broadcaster, a satellite broadcaster, a cable broadcaster, an Internet streaming provider, or any other such content source. Transmission channel 104 may correspond to the type and form of transmission used by the content provider 102, and accordingly may be a terrestrial radio-frequency broadcast, a satellite broadcast, streamed data over broadband cable, digital subscriber line (DSL), or fiber optic cable. In some implementations, transmission channel 104 may be a wide area network (WAN) such as the Internet. Receiver 100 may include or connect to a network interface, demodulator, tuner, amplifier, antenna, satellite dish, and/or other such components to receive media via the transmission channel 104.

Receiver 100 may receive a capture command from a controller 108. In some implementations, a controller 108 may be a remote control, such as a television or cable box remote control, universal remote control, or dedicated remote control for receiver 100, and may transmit a signal to receiver 100 via RF, infrared, Bluetooth, WiFi, or any other such communication method. In such implementations, controller 108 may include a button, switch, touchpad, or other interface through which a user may select to capture media (e.g. a "like" or "share" button, or a capture gesture on a touch pad). In other implementations, a controller 108 may be an audio input to a voice recognition engine for receiving a spoken command from a user (e.g. "share that clip" or a similar command) and providing a corresponding capture command to receiver 100. In still other implementations, a controller 108 may be a video input and gesture recognition engine for identifying a user's gesture in images received from a camera (e.g. tracking a hand wave, head pat, or other gesture) and providing a corresponding capture command to receiver 100. In still other implementations, controller 108 may be part of receiver 100 and/or display 106, and may include a button, switch, touchpad, or other such interface on either or both of the receiver and/or display 106. The capture command transmitted by controller 108 to receiver 100 may be a serial command, parallel command, application layer data packet, or any other type and form of command to instruct the receiver 100 to provide a buffered media clip to a social network provider.

Receiver 100 may provide media clips to a social network provider 110. Social network provider 110 may include one or more servers, server farms, server clusters, or any other such computing devices providing data to one or more users of the social network. In some implementations, social network provider 110 may include a social media site, a website providing user-generated content, a file sharing site, or any other type and form of site for allowing users to share and/or comment on media with other users. In some implementations, receiver 100 may provide media clips to the social network provider 110 as data files, including compressed audio and/or video. In other implementations, receiver 100 may provide media clips to the social network provider 110 as links or addresses at which media clips are stored. For example, in one such implementation, receiver 100 may provide media clips to a third party data storage site, and provide a link or address to the social network provider 110 identifying a storage location of a media clip. In a further such implementation, content provider 102 may provide data storage of media clips, and may communicate with the receiver 100 and social network provider 110 via network 112. This may allow content provider 102 to remove shared media clips after a period of time, consolidate identical or similar media clips shared by a plurality of users, monitor sharing use by users (e.g. to ensure a user is not sharing an entire movie), and/or gather interaction information from users to identify which scenes, programs, or other content are most enjoyed or shared by users for advertising and content generation purposes. In such implementations, receiver 100 may provide the media to content provider 102 or a third party data provider (not illustrated) via network 112, and the receiver 100 or said content provider or third party data provider may transmit an address at which the media is stored to the social network provider for inclusion in a post of the user on the social network site. Network 112 may include any type and form of network or combinations of network including a WAN such as the Internet, a metropolitan area network (MAN), a local area network (LAN), a wired network, a wireless or WiFi network, a cellular network, a mesh network, a point-to-point network, a broadcast network, a telecommunications network, a data communication network, a computer network, or any other such network. The topology of the network may be a bus, star, or ring network topology. The network 112 may be of any such network topology as known to those ordinarily skilled in the art capable of supporting the operations described herein. In some embodiments, different types of data may be transmitted via different protocols. In other embodiments, the same types of data may be transmitted via different protocols.

Media clips may be transmitted via the network 112 in any type and form of protocol, such as hypertext transport protocol (HTTP) file transfers, file transfer protocol (FTP) transfers, email, multimedia messaging (MMS), or other such protocols. Media clips may be transmitted as streamed data in real time or via a real time protocol, may be transmitted as files via lossless transmission protocols (e.g. transport control protocol), or otherwise provided to a social network provider, content provider, or third party data storage provider. In some embodiments in which media files are stored separately from social network provider 110, as discussed above, social network provider 110 may communicate via network 112 with a content provider 102 or third party data storage.

Figure 1B:
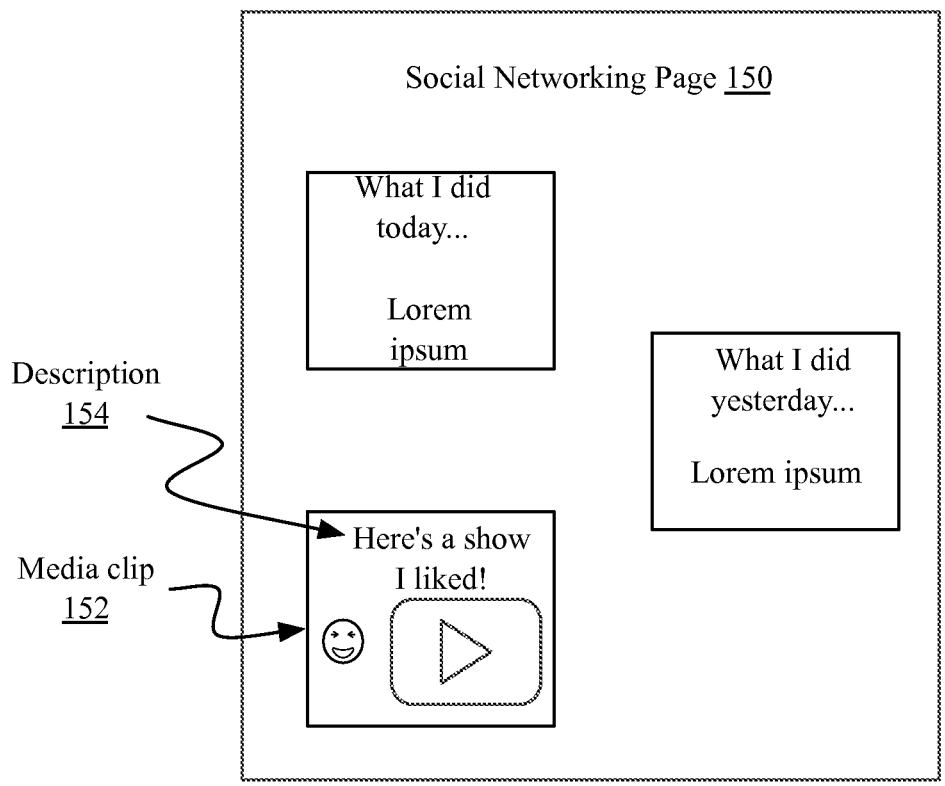
FIG. 1B is an illustration of an embodiment of a user-specific social networking page including a shared media item.

Referring briefly to FIG. 1B, illustrated is an embodiment of a user-specific social networking page 150 including a shared media item or clip 152. Page 150 may be a user profile, time line, channel, journal, blog, feed, or other such site and may provide links to media 152, thumbnails of media 152, an embedded media player for playing a media item or clip 152, or similar such features. Although shown in a staggered layout, social networking page 150 may appear in other formats in various implementations. As shown, in some implementations, a media clip 152 may be associated with a description 154, sometimes referred to as a title, caption, identifier, or by other similar terms. Description 154 may include a title of the media clip or media program that was the source of the clip, a default statement (e.g. "here's a show I liked," or "check out this great clip"), a customized statement that may be generated by the receiver 100 (e.g. "check out this clip from [show title]"), a fully customized statement that may be entered by a user when queried by the receiver 100, or any other such features. In some implementations, a description 154 may include a unique identifier for the media clip 152, such as a uniform resource locator (URL) or uniform resource identifier (URI); a thumbnail or still image selected from the media clip (e.g. a first frame, a last frame, a middle frame, or a user-selected frame); or other such information. The social networking page 150 may allow users, including users other than a user that provided the media clip, to view the media clip 152, either in an embedded player or by loading the media clip in another window or tab of a web browser or other application, or in a separate application. In some implementations, the social networking page 150 may allow users to comment on a media clip or share the media clip or a link to the media clip 152 or page 150 with other users.

Figure 2A:
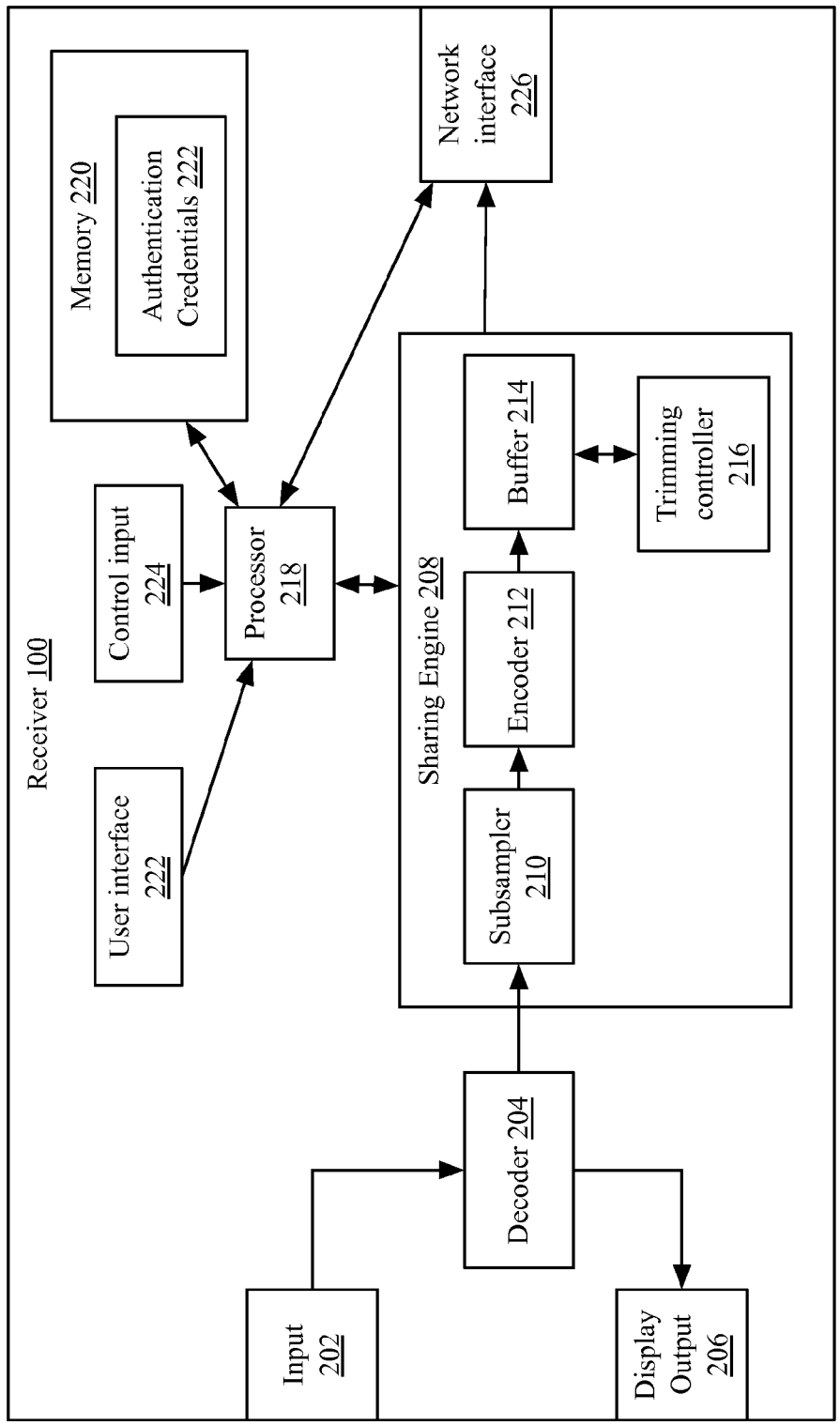
FIG. 2A is a block diagram depicting an embodiment of a device providing encoding and sharing of media.

FIG. 2A is a block diagram depicting an embodiment of a device, such as receiver 100, providing encoding and sharing of media. In brief overview, the device 100 may include an input 202 for a media stream, a decoder 204, and an output to a display 206. Decoder 204 may also output a decoded media stream to a sharing engine 208, which may include a subsampler 210, an encoder 212, and a buffer 214.

Sharing engine 208 may include a trimming controller 216 for adjusting start and end pointers within buffer 214 or otherwise trimming a buffered media clip. Device 100 may include a processor 218 and memory 220, which may store authentication credentials 222 for a social networking or social media service. Responsive to a capture command input to a user interface 222 or received via a control input 224, the receiver 100 may transmit a buffered (and trimmed) media clip via a network interface 226 to a social media provider or other storage location.

Still referring to FIG. 2A and in more detail, a receiver or device 100 may include an input 202. Input 202 may comprise any type of input for receiving a media stream from a content provider, and may include one or more demodulators, amplifiers, tuners, filters, network interfaces, or other such components. Input 202 may include, for example, a coaxial RF connector and tuner components, an Ethernet connector and network interface, or any other such input components for receiving a media stream in any provided format.

Input 202 may provide a received media stream to a decoder 204. Decoder 204 may include hardware, software executed by a processor (e.g. processor 218), or a combination of hardware and software components for decoding an encoded media stream. Decoder 204 may perform decoding of any type and form, including decoding according to a Moving Picture Experts Group (MPEG) or International Telecommunication Union (ITU) standard such as MPEG-2, MPEG-4, H.261, H.264, Advanced Video Coding (AVC), High-Efficiency Video Coding (HVEC), or any other such format. Decoder 204 may perform decompression, entropy decoding, demultiplexing, or any other such functions, and may include a plurality of decoders operating in parallel on a multiplexed stream. In some implementations, decoder 204 may include separate components for decoding audio and video portions of a media stream.

Decoder 204 may output a decoded media stream via a display output 206. Display output 206 may include a digital interface, such as a High-Definition Multimedia Interface (HDMI), a Digital Visual Interface (DVI), an RGB interface, a component video interface, a composite video interface, a baseband RF interface, or any other such interfaces and associated components (e.g. modulators, amplifiers, filters, etc.). Although referred to as a display output, in many implementations, the output 206 may include an audio interface, such as a Sony/Philips Digital Interface (SPDIF), analog balanced or unbalanced audio outputs, or any other such outputs and associated components (e.g. encoders, amplifiers, equalizers, etc.). As discussed above, a display output 206 may be connected to a display or other multimedia equipment, including an audio/video receiver, selector, amplifier, projector, television, monitor, or other such devices.

Decoder 204 may also include a second output or may include a splitter and provide a split output to a sharing engine 208. Sharing engine 208 may include hardware, software executed by a processor such as processor 218 or co-processors, field-programmable gate arrays (FPGAs), or other such devices, or a combination of hardware and software for receiving and buffering a media stream, and providing the stream to a social networking service.

Sharing engine 208 may include a subsampling filter 210 for scaling, subsampling, or otherwise processing the media to reduce one or more of a frame rate, color depth, bit depth, size or resolution, aspect ratio, or otherwise reduce a bit rate or quality of a video, and/or reduce a bit depth, sample frequency, or number of channels of audio. For example, media may be received at a high definition 1080p format at 60 frames per second with 5.1 channels of 24-bit, 96 kHz audio, and may be subsampled, scaled, and mixed down to a 480p format at 30 frames per second with 2 channels of 16-bit, 48 kHz audio. Audio and video may processed separately or in combination by the subsampling filter 210, which may include multiple filters, samplers, mixers, or processors operating in parallel or serial. Reducing the quality of media may allow for faster transmission over a network to a social networking provider or other storage site, may reduce the size of a buffer required to contain a media clip of a predetermined length, and may result in a clip at a degraded quality for fair use under copyright regulations. In some implementations, subsampler 210 may not be utilized or may be bypassed to provide a full quality media clip.

An encoder 212 may receive a subsampled or scaled media stream from a subsampler 210 (or receive uncompressed media from decoder 204, in implementations not including a subsampler 210 or with subsampler 210 bypassed), and may encode the media stream in any type and format of encoding, as discussed above. Encoder 212 may include hardware, software executed by a processor (e.g. processor 218), or a combination of hardware and software components for decoding an encoded media stream. Encoder 212 may encode a media stream in an MPEG standard, H.264 standard, AVC standard, HEVC standard, or any other type and form of media compression format. Encoder 212 may utilize a different encoding format than the media stream was received in and decoded from by decoder 204. Encoder 212 may perform compression, entropy encoding, multiplexing, or any other such functions, and may include a plurality of encoders operating in parallel on a multiplexed stream. In some implementations, encoder 212 may include separate components for encoding audio and video portions of a media stream.

The encoded (and subsampled) media stream may be stored in a buffer 214. Buffer 214 may be a circular or ring buffer, or other data structure stored in a memory unit of the device 100. Buffer 214 may comprise any type and form of memory, including NAND or NOR flash memory, Static random access memory (SRAM), Dynamic random access memory (DRAM), Ferroelectric RAM (FRAM), Solid State Drives (SSD), or other such memory. In some implementations, buffer 214 may be referred to as a cache, media storage, clip storage, or by other such terms. In some implementations, buffer 214 may continuously store a predetermined duration of a media stream received from a decoder 204 (and subsampled and/or encoded), such as one minute, three minutes, five minutes, or any other such duration, and may continuously overwrite older data.

Figure 2B:
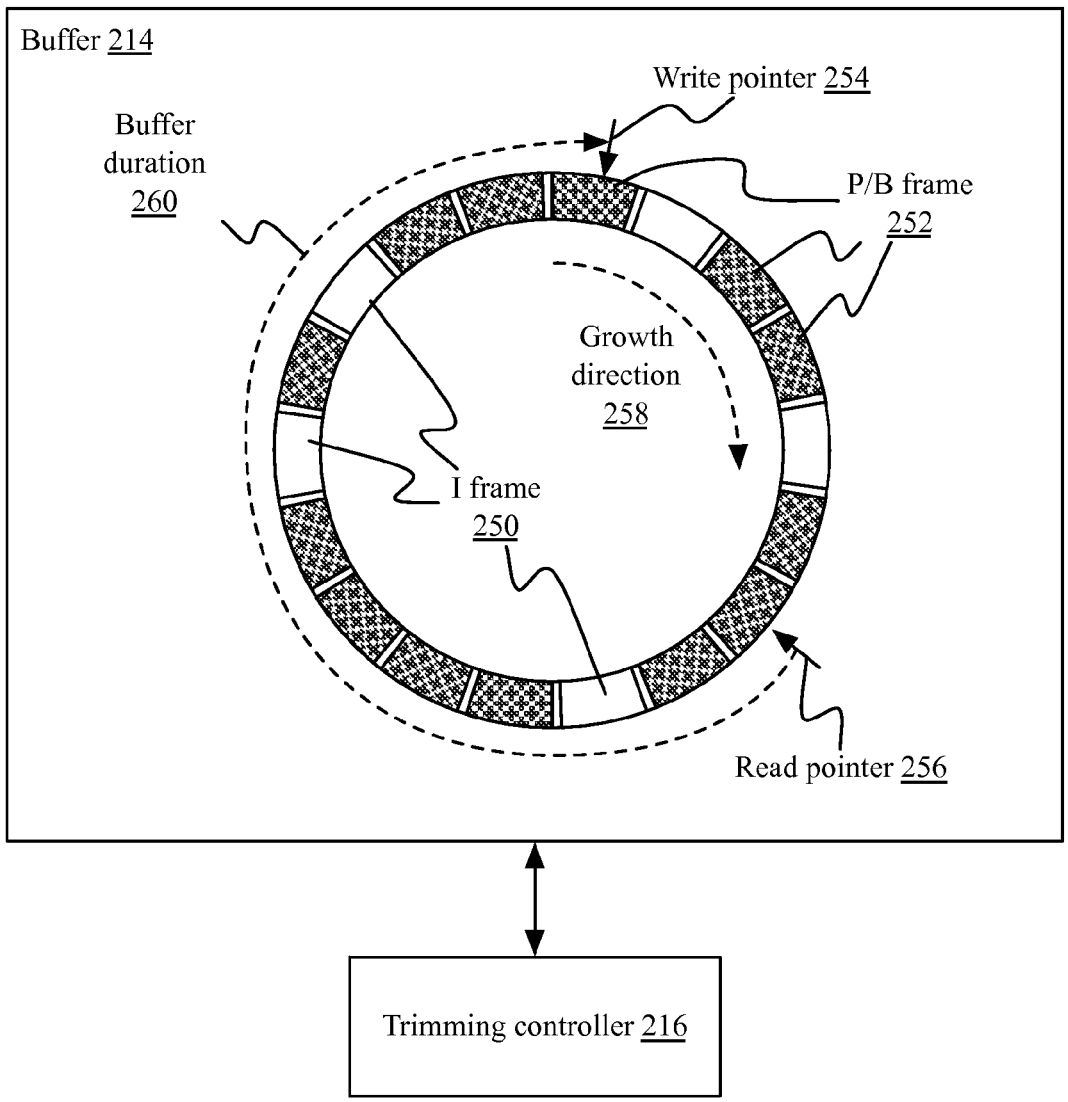
FIG. 2B is a diagram depicting an implementation of a buffer of a device of FIG. 2A.

For example, referring to FIG. 2B, illustrated is a diagram depicting an implementation of a buffer 214 of a device 100 of FIG. 2A. In the implementation shown, buffer 214 includes a ring buffer storing a plurality of encoded media frames 250-252 received from an encoder. Frames may be written to storage locations in the buffer at a write pointer 254, with the write pointer 254 advancing in a growth direction 258 for each newly received frame or set of frames. Similarly, a read pointer 256 may be advanced in the growth direction once the buffered media duration 260 has reached a predetermined number of frames or media length, as discussed above. As new frames are received and the write pointer 254 and read pointer 256 are advanced, the buffered duration 260 includes a constant number of frames or duration or length of media, such as the last 3 minutes of media (or any other such duration, as discussed above). When the device 100 receives a request from a user to provide a media clip to a social networking service, the contents of the buffered duration 260 may be transmitted to the social networking service. In one such implementation, a second read pointer (not illustrated) may be created and advanced through the buffer duration 260 from the read pointer 256 to the write pointer 254 as each frame is retrieved. In another such implementation, the data in the buffer from the read pointer to write pointer may be output as a string or stream with a beginning of file marker before the buffer contents at the read pointer 256 and end of file marker after the buffer contents at the write pointer 254. In other implementations, the buffer may be a first-in, first-out buffer and old data may be withdrawn or discarded from the buffer when the buffer is full to accommodate new data.

In some implementations, as shown, a buffered encoded media stream may include intra-coded frames or slices (I-frames) 250, which may be coded without reference to any frame except themselves; and predicted frames or slices (P-frames) or bi-directional predicted frames or slices (B-frames) 252, which may be coded with reference to other frames. If a buffered media clip includes start and end points on P- or B-frames, then such frames may not be able to be properly decoded. For example, a clip that starts with a B-frame may require a previous I-frame to decode said B-frame, but the I-frame may not be included in the transmitted clip. Decoding and playback of such media clips may result in visible artifacts due to the missing information from non-included frames. Accordingly, in some implementations, the sharing engine may include a trimming controller 216, which may move pointers 254, 256 or a beginning and end of a clip to a next or previous I-frame 250 during extraction of the clip from the buffer. In some implementations, the beginning of the clip may only be advanced to a next I-frame, while in other implementations (such as where the buffer includes a portion of old data between the read pointer 256 and write pointer 254 as shown) the beginning of the clip may be moved forwards or backwards to a nearest I-frame. The end of a clip may be moved backwards from a write pointer 254 to a nearest I-frame. In many implementations, the end of the clip may not be moved forwards from the write pointer 254, as the buffer 214 only includes old data beyond the write pointer 254; in other implementations, beginning and end markers for the clip may be placed responsive to the capture command from the user, and the end marker may be moved forward to the next I-frame as additional frames are received, encoded, and stored in buffer 214 prior to transmission of the clip to the social networking provider. Accordingly, trimming controller 216 may include functions for identifying a type of frame as an I-frame, B-frame or P-frame (e.g. from a header of each frame), and for placing and/or moving markers or pointers within the buffer 214.

In a further implementation, a user may trim a captured media clip by directing the trimming controller 216 to move beginning and/or end markers forwards or backwards through the clip (or forwards and backwards to successive I-frames 250 within the clip). For example, in such one such implementation, the buffer 214 may store a five minute media clip, but prior to transmission of the clip to a social networking provider, a user may trim the clip to a desired thirty seconds. Such trimming may be done through moving pointers or markers in the buffer in a similar manner to trimming the clip to a nearest I-frame 250 as discussed above.

Returning to FIG. 2A, the device 100 may include a processor 218, sometimes referred to as a central processing unit or microprocessor. The processor 218 is any logic circuitry that responds to and processes instructions fetched from memory 220 and/or controls other components within device 100 including a user interface 222, sharing engine 208, or network interface 226. In many embodiments, the processor 218 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The device 100 may be based on any of these processors, or any other processor capable of operating as described herein.

Device 100 may include a memory 220, sometimes referred to as a main memory unit 220. Memory 220 may be one or more memory chips capable of storing data and allowing any storage location to be directly accessed by the processor 218, such as any type or variant of SRAM, DRAM, FRAM, NAND Flash, NOR Flash, or SSD. The memory 220 may be based on any of the above described memory chips, or any other available memory chips capable of operating as described herein. In some implementations, buffer 214 may be stored in memory 220, while in other implementations, buffer 214 may be a separate memory chip or chips.

Processor 218 may communicate with main memory 220 via a system bus or memory port, such as a backside or frontside bus, a system bus, a VESA VL bus, an ISA bus, an EISA bus, a MicroChannel Architecture (MCA) bus, a PCI bus, a PCI-X bus, a PCI-Express bus, or a NuBus.

Memory 220 may include authentication credentials 222 for one or more users of device 100 to log into one or more social networking or media services, third party storage services, and/or content providers. Authentication credentials 222 may include a user name, account name, login name, handle, password, PIN code, biometric information, or any other type and form of credential or authorization information. In many implementations, device 100 may use authentication credentials 222 to login or verify the identity of the user when transmitting a captured media clip to a social networking service or other party.

In some implementations, memory 220 may store an operating system and/or one or more applications for execution by processor 218. The device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

Device 100 may include a user interface 222 for controlling the device to capture media, trimming clips via trimming controller 216, and/or entering authentication credentials 222. User interface 222 may include one or more input devices, such as keyboards, mice, trackpads, trackballs, microphones, dials, touch pads, touch screen, buttons, switches, and drawing tablets, which may be connected via a wired interface, such as a universal serial bus (USB) interface, or via a wireless interface, such as a Bluetooth interface. User interface 222 may include visual or audible elements, which may be output via video displays, speakers, projectors, LCD or LED displays, or other such displays. In some implementations, visual or audible portions of a user interface 222 may be provided via display output 206. For example, an on-screen display may be provided by the device 100 to a display 106.

Device 100 may include a control input 224 for receiving a control from a second device, such as a remote control. Control input 224 may include an infrared receiver, Bluetooth receiver, WiFi network interface and monitoring software or APIs, RF receiver, or other such interfaces for receiving commands transmitted from another device. For example, in one implementation, a remote control may include a "share" button. When a user presses the share button, the remote control may transmit a capture code via an infrared interface of the remote control to a corresponding infrared receiver 224 of device 100. In other implementations, the remote control may be an application executing on a smart phone, tablet computer, laptop computer, or other such device, and the control input 224 may be a corresponding interface for receiving commands from the application (e.g. a representational state transfer (RESTful) command, a remote API command, or other such command).

Device 100 may include a network interface 226 to interface to the network 112 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the device 100 communicates with other devices, such as those of a social network provider, storage provider, or content provider, via any type and/or form of gateway or tunneling protocol such as Secure Socket Layer (SSL) or Transport Layer Security (TLS). The network interface 226 may include a built-in network adapter, network interface card, PCMCIA network card, card bus network adapter, wireless network adapter, USB network adapter, modem or any other device suitable for interfacing the device 100 to any type of network capable of communication and performing the operations described herein.

Figure 3A:
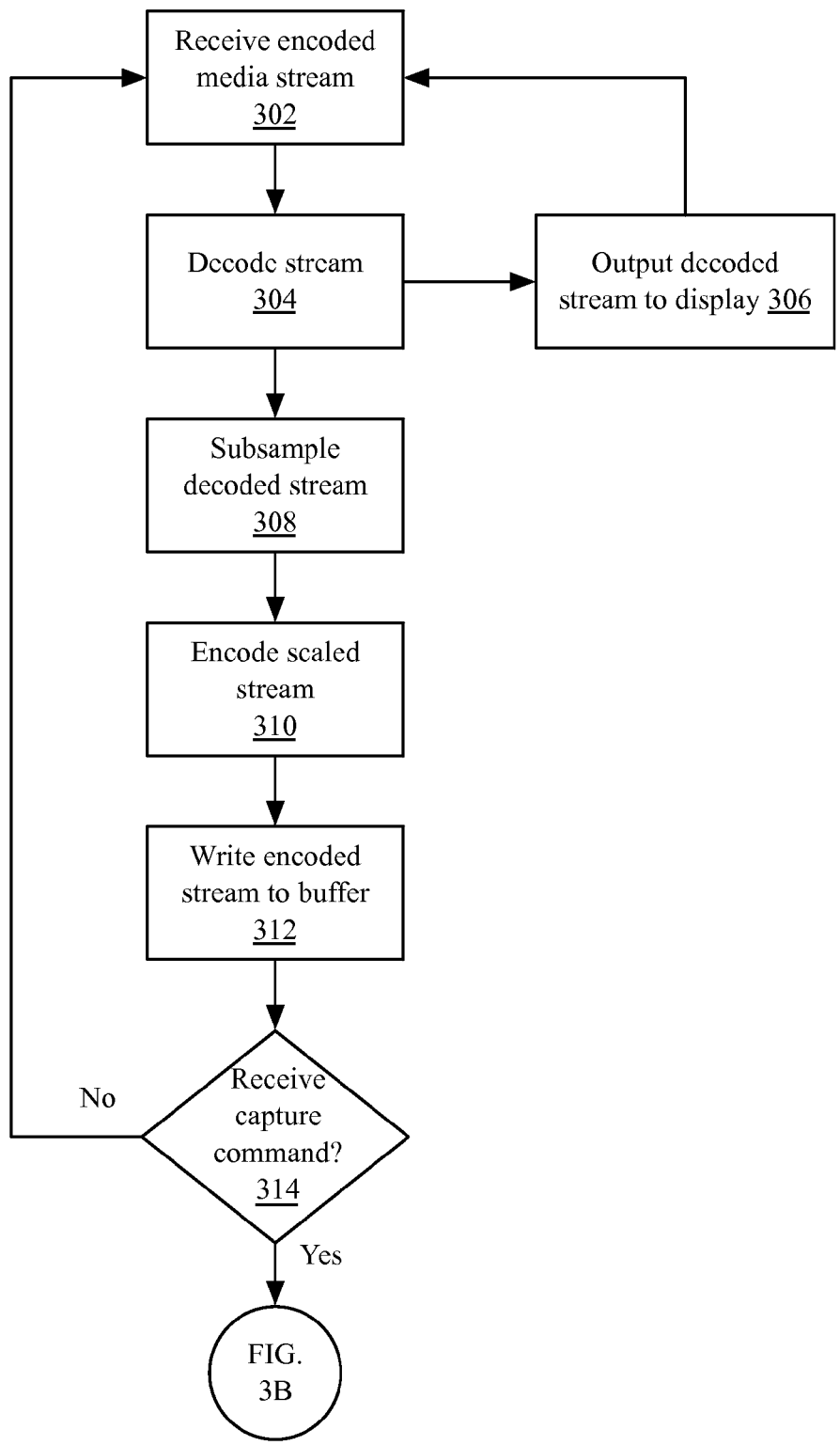
FIGS. 3A and 3B are flow charts depicting an embodiment of a method of encoding and sharing media via a social network.
Figure 3B:
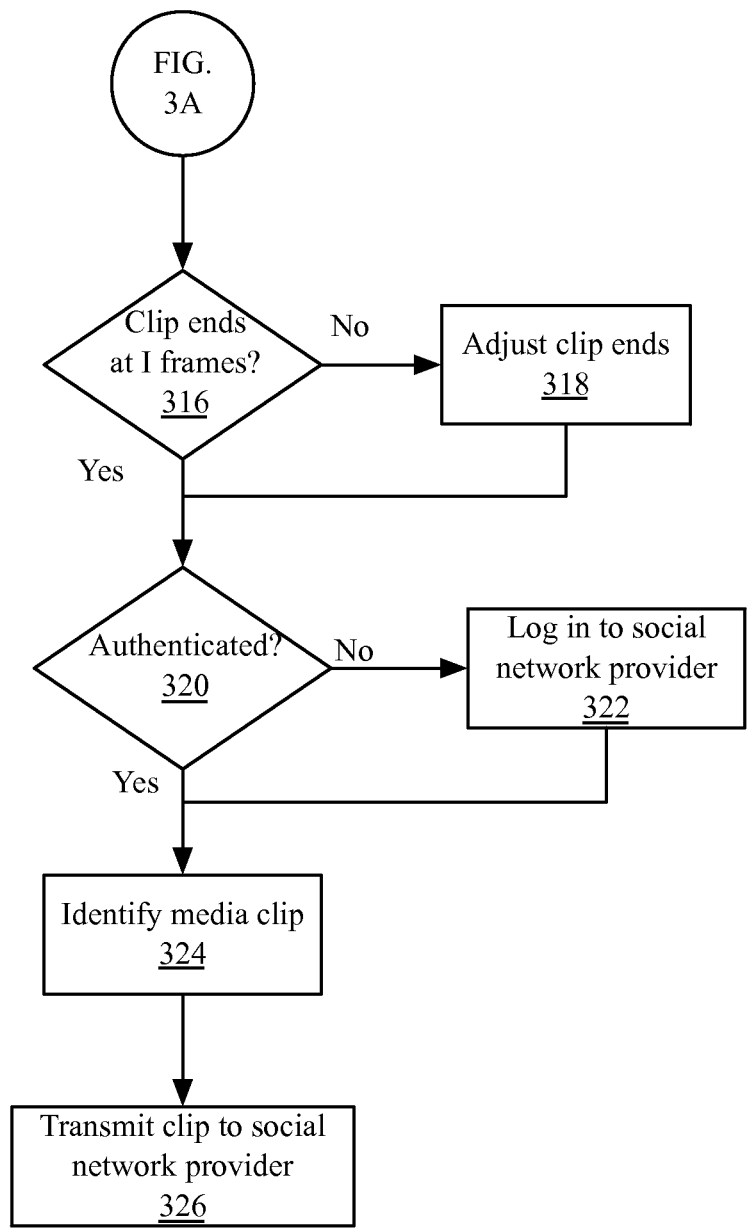

FIGS. 3A and 3B are flow charts depicting an embodiment of a method of encoding and sharing media via a social network. In brief overview, starting on FIG. 3A at step 302, a device may receive an encoded media stream from a content provider. At step 304, the device may decode the stream and, at step 306, output the decoded stream to a display or other device. At step 308, the device may also scale or subsample the decoded stream, and at step 310, encode the subsampled or scaled stream. At step 312, the device may write the encoded stream to a buffer. If the device does not receive a capture command, steps 302-312 may be repeated iteratively. In some implementations, steps 302-312 may also continue in parallel to capture and transmission of a media clip. If the device does receive a capture command at step 314, then, continuing on FIG. 3B, the device may determine at step 316 whether the clip ends at intra-coded frames. If not, then at step 318, the device may adjust the clip ends to coincide with I-frames. At step 320, the device may determine whether it is authenticated with a social network provider or other third party. If not, then at step 322, the device may log in to the provider. At step 324, the device may identify the media clip, and at step 326, the device may transmit the media clip to the social network provider and/or third party storage.

Referring to FIG. 3A and in more detail, at step 302 a device may receive an encoded media stream from a content provider. As discussed above, the encoded media stream may be received via a terrestrial or satellite broadcast, cable broadcast, network broadcast, or other such format. The media stream may be encoded in any type and form of media compression.

At step 304, a media decoder or video decoder of the device may decode the stream. Decoding the stream may include buffering the stream, decompressing the stream, and/or decoding the stream in accordance with a standard encoding format.

At step 306, the device may output the decoded stream to a display or other device. Outputting the decoded stream may include transmitting the stream to the display or other device, such as via an HDMI connection or other such interface. In some implementations, step 306 may be skipped, such as where a display is turned off.

A second output of the video decoder may be provided to a sharing engine, or the output of the video decoder may be split and provided to the sharing engine. At step 308, a subsampler of the sharing engine may scale and/or subsample the decoded stream. As discussed above, subsampling the decoded stream may include reducing a frame rate, resolution, size, color depth, bit depth, number of audio channels, sampling frequency, or other characteristic or feature of the decoded stream. Subsampling rates or amounts of reduction may be variable or fixed. For example, in one such implementation, a buffer size of the sharing engine may be fixed (e.g. 50 MB), and the device may determine a subsampling rate such that a predetermined time (e.g. 5 minutes) of subsampled and encoded video may be stored in the buffer. In a further such implementation, the user may be able to set the predetermined buffer time, and the sharing engine may adjust subsampling parameters such that the fixed size buffer may store a duration of encoded media equal to the user-set time. In another such implementation, the subsampling rate or rates may be set by a user, allowing adjustment of quality. In some implementations, the subsampling rate or rates may be adjusted relative to a maximum quality threshold, which may be set by a content provider to ensure that media clips are at a reduced quality from the original clips.

At step 310, a video encoder of the sharing engine may encode the subsampled or scaled stream. As discussed above, in some implementations, the video encoder may encode the stream in the same encoding format in which the stream was originally encoded, or a different format. For example, the stream may have been received with H.264 encoding and may be subsampled and re-encoded with MPEG-4 encoding.

At step 312, the sharing engine may write the encoded stream to a buffer. As discussed above, the buffer may be a ring buffer or circular buffer, such that the sharing engine may continuously write the encoded stream to the buffer, writing over older data. Accordingly, the buffer may hold a fixed amount or length of media from the past n seconds or minutes. As discussed above, in some implementations, writing the encoded stream to the buffer may comprise advancing read and/or write pointers along the buffer. In other implementations, the buffer may be a first-in, first-out buffer and old data may be withdrawn or discarded from the buffer when the buffer is full to accommodate new data. Steps 302-312 may be repeated continuously for newly received data, or, in some implementations, steps 308-312 may be paused on receipt of a capture command at step 314. As discussed above, the capture command may be received from another device, such as a remote control, or may be received via an interface of the device 100.

Continuing on FIG. 3B, and responsive to receiving the capture command, a trimming controller of the sharing engine may determine at step 316 whether the clip ends at intra-coded frames or frames that do not need additional data from other frames to be decoded. Determining whether the clip ends at intra-coded frames may include reading the headers of a beginning and end frame of the buffered media clip. In many implementations, frame headers may include a flag or string identifying whether the frame is an I-frame, B-frame, or P-frame.

If the beginning and end frames are not I-frames, then at step 318, the trimming controller may adjust the clip ends to coincide with I-frames. Adjusting the clip ends may include moving start or end markers or read or write pointers forwards or backwards in the buffer to the nearest I-frame, which may be identified via headers as discussed above. In many implementations, a start marker may be moved forwards or backwards, while an end marker may only be moved backwards, to prevent the controller from moving the end marker beyond a write pointer into old data within the buffer.

At step 320, the device may determine whether it is authenticated with a social network provider or other third party such as a third party data storage site or the content provider. Determining whether the device is authenticated may include identifying whether an authentication token or cookie has expired, whether a login timer has expired, or any other similar function.

At step 322, if the device is not authenticated, the device may log in to the social network provider, third party storage site, or content provider. Logging in may include establishing a communications session with the destination device, and transmitting one or more user credentials, such as a username and password, email address, IP address, or other such information. In some implementations, the device may receive an authentication token or cookie for transmission with a media clip or for other future transactions. The token or cookie may include an expiration time, after which the device may need to log in again. In some implementations, such as where a media clip is provided to a third party storage site or content provider and the clip is identified to a social network provider, the device may log in to each corresponding site or server separately.

At step 324, the device may identify the media clip with a name, description, title, default caption, customized caption, or any other such information. In some implementations, information may be explicitly provided with the media when transmitted by the content provider, such as via metadata, closed captioning data, program tags, or other such information. In other implementations, the device may identify the media clip based on a channel, date, and time of receipt, and in a further implementation, the device may retrieve a program title from an electronic program guide based on the channel, date, and time of receipt. In some implementations, the device may query the user for a caption or other information, while in other implementations, the media clip may be posted to a social network timeline with a default caption that the user may subsequently edit.

At step 326, the device may transmit the media clip to the social network provider and/or third party storage or content provider. As discussed above, transmitting the media clip may include establishing a connection, authenticating or logging in, transmitting the clip as a file transfer or media stream, providing media clip information or captions, or sending other such data. In some implementations, transmitting the media clip may include transmitting the media clip to a third party storage site or content provider; receiving a URL or URI of the stored media clip; and transmitting a request for a new post to a social networking provider identifying the URL or URI of the stored media clip at the third party storage site or content provider.

Accordingly, the systems and methods discussed herein provide easy and efficient sharing of media clips via a social networking site, with the user able to select to share a clip in real time as they watch live broadcast programming, without having to set the device up to record in advance of a funny or interesting moment. Clips may be subsampled and encoded in real-time providing efficient data transfers and compliance with fair use requirements.

Although the disclosure may reference one or more "users", such "users" may refer to user-associated devices or stations, for example, consistent with the terms "user" and "multi-user" typically used in the context of a multi-user multiple-input and multiple-output (MU-MIMO) environment.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A device for encoding and sharing media for social networks, comprising:
    a video decoder, a sharing engine comprising a buffer, and a network interface installed within a housing of the device;
    wherein the video decoder is configured to:
        receive an encoded media stream at a first resolution,
        decode the encoded media stream, and
        provide the decoded media stream to a display output and the sharing engine;
    wherein the sharing engine is configured to:
        write a predetermined duration of the decoded media stream to the buffer; and
    wherein the network interface is configured to, responsive to receipt of a capture command:
        retrieve the predetermined duration of the media stream from the buffer of the sharing engine, and
        transmit the retrieved predetermined duration of the media stream via a network to a second device.

2. The device of claim 1, wherein the sharing engine further comprises a video encoder configured to encode the decoded media stream.

3. The device of claim 2, wherein the sharing engine further comprises a subsampler configured to scale the decoded media stream to a second, lower resolution prior to encoding.

4. The device of claim 2, wherein the network interface is further configured to trim the beginning and end of the retrieved duration of the decoded media stream to independently decodable frames prior to transmission of the media stream via the network to the second device.

5. The device of claim 1, wherein the buffer comprises a ring buffer, and wherein the sharing engine is further configured to overwrite a portion of the buffered media stream.

6. The device of claim 1, further comprising a receiver configured to receive the capture command from a third device.

7. The device of claim 1, wherein the network interface is further configured to transmit an identification of the media stream to the second device for association with the trimmed duration of the decoded media stream.

8. The device of claim 1, wherein the network interface is further configured to transmit a user credential to the second device.

9. A method for encoding and sharing media for social networks, comprising:
    receiving, by a video decoder installed within a housing of a device, a media stream;
    writing, by a sharing engine installed within the housing of the device, the media stream to a buffer;
    receiving, by the device, a capture command;
    retrieving, by the device, the buffered media stream, responsive to receiving the capture command; and
    transmitting the buffered media stream to a second device, by a network interface installed within the housing of the device, responsive to receiving the capture command.

10. The method of claim 9, further comprising:
    decoding, by the video decoder, the media stream;
    providing, by the video decoder, the decoded media stream to a display output and the sharing engine; and
    encoding, by the sharing engine, the decoded media stream.

11. The method of claim 10, wherein the media stream is received by the video decoder and decoded at a first resolution; and wherein encoding the decoded media stream further comprises scaling the media stream, by a subsampler of the sharing engine, to a second, lower resolution.

12. The method of claim 11, wherein writing the media stream to the buffer further comprises writing the encoded media stream at the second, lower resolution to the buffer.

13. The method of claim 11, wherein the media stream is received by the video decoder and decoded at a first frame rate; and wherein encoding the decoded media stream further comprises subsampling the media stream, by a subsampler of the sharing engine, to a second, lower frame rate.

14. The method of claim 9, further comprising trimming the beginning and end of the buffered media stream to independently decodable frames, by the device, prior to transmission of the buffered media stream to the second device.

15. The method of claim 9, wherein receiving the capture command further comprises receiving, by the device, the capture command from a third device.

16. The method of claim 9, wherein transmitting the buffered media stream to the second device further comprises transmitting an identification of the media stream to the second device for association with the media stream.

17. The method of claim 9, wherein transmitting the buffered media stream to the second device further comprises transmitting a user credential to the second device.

18. The method of claim 17, wherein the second device provides the buffered media stream to one or more client devices as part of a social networking profile associated with the user credential.

19. A device for encoding and sharing media for social networks, comprising:

an input device; and a transmitter configured to transmit a capture command to a second device, responsive to receiving a user interaction via the input device;

the capture command causing the second device to retrieve a media stream from a buffer installed within the housing of the second device and transmit the buffered media stream via a network to a third device, the media stream received by the second device encoded by a sharing engine installed within the housing at a first resolution, decoded, scaled to a second, lower resolution, encoded, and written to the buffer.

20. The device of claim 19, wherein the input device comprises a button, and the transmitter comprises an infrared transmitter.

* * * * *